United States Patent
Yang et al.

(10) Patent No.: US 10,903,733 B2
(45) Date of Patent: Jan. 26, 2021

(54) DISC-TYPE SPEED REGULATION MAGNETIC COUPLER BASED ON BEVEL GEAR DRIVE

(71) Applicant: JIANGSU UNIVERSITY, Jiangsu (CN)

(72) Inventors: Chaojun Yang, Jiangsu (CN); Kang Liu, Jiangsu (CN); Weifeng Zhang, Jiangsu (CN); Yingzhi Wu, Jiangsu (CN); Ming Liu, Jiangsu (CN); Airen Yuan, Jiangsu (CN); Li Wu, Jiangsu (CN); Zhiming Zhou, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 2 days.

(21) Appl. No.: 16/473,517

(22) PCT Filed: Oct. 31, 2017

(86) PCT No.: PCT/CN2017/108520
§ 371 (c)(1),
(2) Date: Jun. 26, 2019

(87) PCT Pub. No.: WO2018/233173
PCT Pub. Date: Dec. 27, 2018

(65) Prior Publication Data
US 2020/0153326 A1    May 14, 2020

(30) Foreign Application Priority Data

Jun. 19, 2017 (CN) .......................... 2017 1 0461913

(51) Int. Cl.
*H02K 49/10* (2006.01)
*H02K 7/11* (2006.01)
(Continued)

(52) U.S. Cl.
CPC ............. *H02K 49/108* (2013.01); *F16H 1/14* (2013.01); *H02K 7/116* (2013.01)

(58) Field of Classification Search
CPC ......... H02K 49/108; H02K 7/116; F16H 1/14
(Continued)

(56) References Cited

U.S. PATENT DOCUMENTS 5,477,093 A * 12/1995 Lamb ................... H02K 49/046
310/75 D
5,569,111 A    10/1996 Cho et al.
(Continued)

FOREIGN PATENT DOCUMENTS

CN       102664512 A    9/2012
CN       102931806 A    2/2013
(Continued)

OTHER PUBLICATIONS

International Search Report for PCT Application No. PCT/CN2017/108520, dated Dec. 26, 2017.

*Primary Examiner* — John K Kim
(74) *Attorney, Agent, or Firm* — Marshall, Gerstein & Borun LLP

(57) ABSTRACT

A disc-type speed regulation magnetic coupler based on bevel gear drive is provided, consisting of a driving disc assembly and a driven disc assembly, wherein a speed regulation device is mounted on the driving disc assembly.

5 Claims, 3 Drawing Sheets

(51) Int. Cl.
*F16H 1/14* (2006.01)
*H02K 7/116* (2006.01)

(58) Field of Classification Search
USPC .......................................... 310/92, 99, 100
See application file for complete search history.

(56) References Cited

U.S. PATENT DOCUMENTS

| | | | | |
|---|---|---|---|---|
| 5,668,424 A | * | 9/1997 | Lamb | H02K 49/046 310/103 |
| 5,739,627 A | * | 4/1998 | Lamb | H02K 49/046 310/75 D |
| 5,834,872 A | * | 11/1998 | Lamb | H02K 49/046 310/103 |
| 5,903,075 A | * | 5/1999 | Lamb | H02K 49/108 310/105 |
| 6,072,258 A | * | 6/2000 | Lamb | H02K 49/046 310/191 |
| 2005/0104466 A1 | * | 5/2005 | Barreiro | H02K 16/005 310/114 |
| 2013/0274053 A1 | * | 10/2013 | Bauerlein | H02K 7/116 475/150 |
| 2015/0222149 A1 | * | 8/2015 | Nakamura | H02K 1/06 310/152 |
| 2019/0157963 A1 | * | 5/2019 | Yang | H02K 49/10 |
| 2020/0153326 A1 | * | 5/2020 | Yang | H02K 7/116 |

FOREIGN PATENT DOCUMENTS

| | | |
|---|---|---|
| CN | 102299611 B | 3/2013 |
| CN | 104852538 A | 8/2015 |
| CN | 106712453 A | 5/2017 |

\* cited by examiner

DISC-TYPE SPEED REGULATION MAGNETIC COUPLER BASED ON BEVEL GEAR DRIVE

TECHNICAL FIELD

The present invention belongs to the field of transmission technology in mechanical engineering, and relates to a transmission device which can realize torque transmission through a non-contact connection, in particular a disc type speed regulation magnetic coupler based on bevel gear transmission, which can be used between a large vibration motor and a load as a transmission system for power transmission and speed regulation.

BACKGROUND ART

The magnetic coupler uses the magnetic field generated by the permanent magnet to transmit force and motion. Using the magnetic coupler to adjust the speed of wind turbine and the pump can compensate for the shortage of frequency converter in specific occasions. On one hand, the driving and driven discs in the magnetic coupler are physically separated from each other, so that the magnetic coupler can work normally in various harsh occasions. In the harsh occasions full of coal powder, furnace ash and corrosive gas, such as thermal power plants, coal mines, etc., the magnetic coupler can still drive the load of wind turbines and pumps to operate stably. It is characterized with high reliability, low maintenance cost and high production efficiency. On the other hand, the use of magnetic couplers can also greatly reduce power consumption. When the operating speed and flow rate of wind turbines and pumps are controlled at 80% of the rated value, the energy consumption is 64% of rated power, thus energy and production costs are greatly saved. In addition to energy saving, suitable for harsh working environment and high reliability, magnetic couplers are generally used in wind turbines and pumps to achieve the following advantages: (1) driving and driven discs are separated, resulting in good isolation and overload protection performance, and realization of soft start; (2) simple structure of parts, low cost of manufacturing, assembly and equipment maintenance; (3) no high frequency current, no higher harmonics and electromagnetic interference; (4) speed regulation mechanism is a purely mechanical non-electronic device that can tolerate certain alignment errors, resulting in high reliability and long system life.

Jiangsu University disclosed a meshing-area-adjustable asynchronous magnetic torque converter and a speed regulation method thereof in Patent No. 201210434367.5. A pair of meshed bevel gears is controlled by a micro motor, and the rotation of the motor is converted into axial displacement of the inner rotor base body by the output bevel gear driving the screw rotation, thereby adjusting the meshing area between the permanent magnet and the copper strip to achieve speed regulation. The present invention transforms the axial displacement of the shifting block into the circumferential rotation of the large bevel gear sleeve by the large bevel gear sleeve, and finally realizes the rotational movement of the N pole (or S pole) permanent magnet through bevel gear meshing. Moreover, the average facing area and the air gap spacing between part of the permanent magnets and the conductor ring are changed, and the manner in which the N and S poles are alternately arranged is also changed, thereby the air gap flux density is adjusted to achieve the speed regulation effect.

CONTENT OF THE INVENTION

A disc-type speed regulation magnetic coupler based on bevel gear transmission is composed of a driving disc assembly and a driven disc assembly, wherein the speed regulation device is mounted on the driven disc assembly. The driven disc assembly includes a driven shaft, a driven disc and a conductor ring, the right end of the driven shaft is connected to the driven disc through a key, and the conductor ring is mounted on the right side of the driven disc.

The driving disc assembly comprises a driving shaft, a driving disc, a permanent magnet assembly, a small gear shaft, a small bevel gear, a large bevel gear sleeve, a shifting block and a shifting block pin. A permanent magnet, the magnetization direction of which is opposite to that of the magnet on the permanent magnet assembly, is fixedly mounted on the left side of the driving disc and one axial through hole used for arrangement of the permanent magnet assembly is formed between every two permanent magnets, so that the permanent magnets on the driving disc assembly are alternately arranged in N and S poles, wherein the permanent magnet assembly is a structure in which the permanent magnet is fixedly mounted with yoke of the same area. The small gear shaft is mounted on the driving disc through two radial circular through holes on the side of the driving disc, and the permanent magnet assembly is fixedly connected to the upper end of the small gear shaft, the small bevel gear is fixedly connected to the lower end of the small gear shaft. In addition, the large bevel gear sleeve meshes with the small bevel gear, and at the same time the right side of the driving disc is connected with the driving shaft through a key, and the outer side of the driving shaft is sleeved with the large bevel gear sleeve, the shifting block pin fixedly connected with the shifting block is inserted into the chute of the large bevel gear sleeve and the straight groove of the driving shaft, and the shifting block pin is kept in contact with the chute wall of the large bevel gear sleeve and the straight groove wall of the driving shaft.

Working principle: by shifting the shifting block, the shifting block as well as the shifting block pin axially slides along the straight groove of the driven shaft. Due to the contact cooperation of the shifting block pin with the chute wall of the large bevel gear sleeve, the large bevel gear sleeve is driven to rotate circumferentially, and the rotating large bevel gear sleeve drives the small gear shaft as well as the permanent magnet assembly to rotate simultaneously through the meshing action with the small bevel gear, thereby the average facing area and the air gap spacing between the permanent magnet assembly part and the conductor ring are changed. At the same time, the way in which the permanent magnets are alternately arranged in N and S poles is also gradually changed, and then the air gap flux density is adjusted to achieve the speed regulation effect.

The speed regulation mode in the magnetic coupler of the present invention is different from the speed regulation mode in the conventional magnetic coupler, the speed regulation of the conventional magnetic coupler is only by adjusting the air gap spacing or the facing area between the permanent magnet and the conductor layer. In the speed regulation process of the present patent, not only the average facing area and the air gap spacing between a part of the permanent magnet (the permanent magnet assembly part) and the conductor layer are changed, but also the manner in which the permanent magnets are alternately arranged in N and S poles is also gradually changed, and the speed regulation is realized by breaking the magnetic paths of the N and S poles. In this way, the work done in the speed regulation process (especially the disc-type magnetic coupler) can be greatly reduced to achieve the purpose of simple speed regulation.

ADVANTAGES OF THE INVENTION (1) Non-contact cooperation exists between the driving disc and the driven disc, the torque transmission through the air gap flux density between the driving and driven discs can effectively solve the problems of alignment, soft start, overload protection and vibration isolation during the rotation process.

(2) In the present invention, the conventional manner of changing the air gap spacing or the facing area of the permanent magnet and the conductor ring is not completely used. Rather, while the average facing area and air gap spacing between part of the permanent magnet (permanent magnet assembly part) and the conductor ring are changed, the alternating arrangement of the permanent magnet in N and S poles is gradually changed. In this way, the speed can be changed without changing the overall relative position of the driving and driven discs, and the space is effectively utilized.

BRIEF DESCRIPTION OF DRAWINGS

The invention will be further described below with reference to the accompanying drawings and embodiments.

EMBODIMENTS

Figure 1:
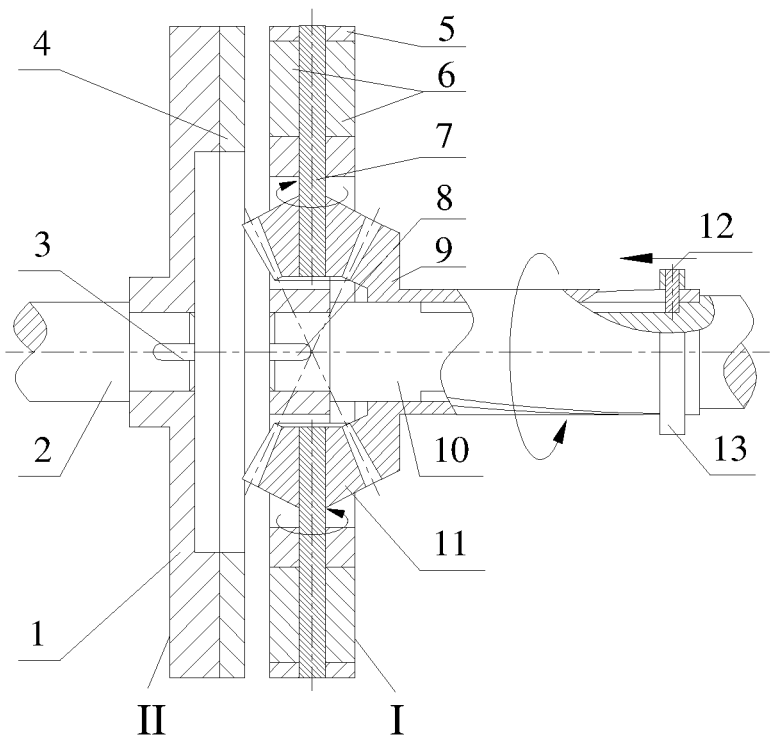
FIG. 1 is a schematic cross-sectional view showing the working principle and structure of a disc-type speed regulation magnetic coupler based on bevel gear transmission of the embodiment.
Figure 2:
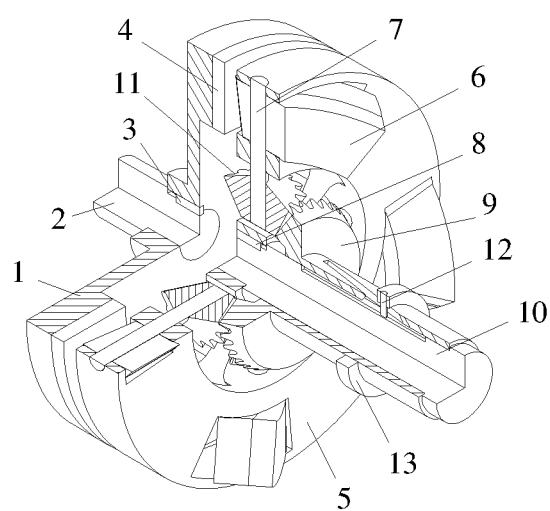
FIG. 2 is a quarter-sectional view showing a three-dimensional structure of the disc-type speed regulation magnetic coupler based on bevel gear transmission of the embodiment.
Figure 3:
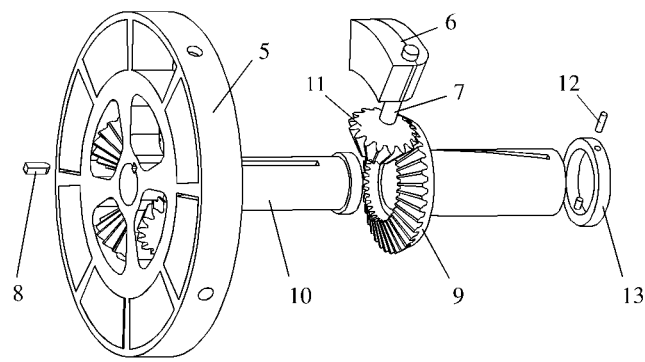
FIG. 3 is a three-dimensional exploded view of the driving disc assembly of the embodiment.
Figure 4:
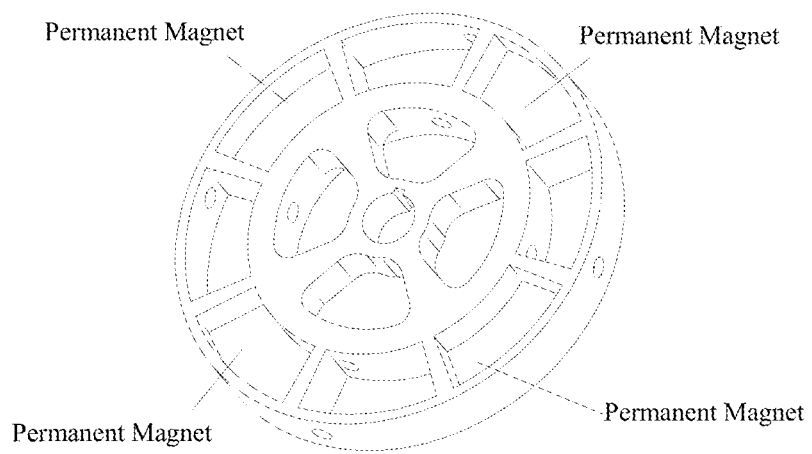
FIG. 4 is a three-dimensional structure diagram of a driving disc of the embodiment.
Figure 5:
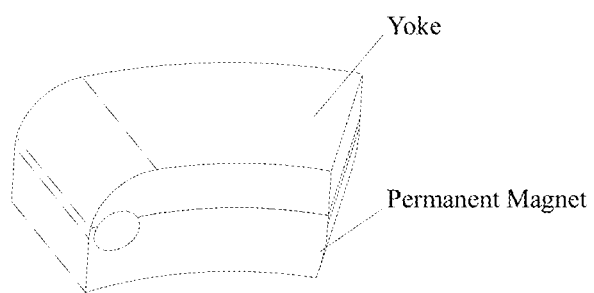
FIG. 5 is a three-dimensional structure diagram of a permanent magnet assembly of the embodiment.
Figure 6:
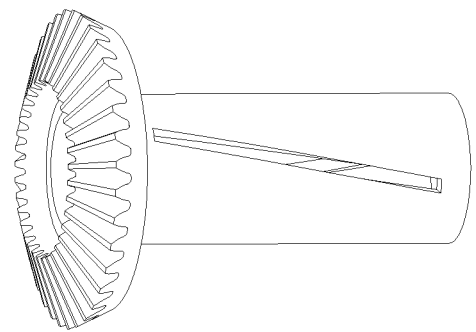
FIG. 6 is a three-dimensional structure diagram of a large bevel gear sleeve of the embodiment.
Figure 7:
FIG. 7 is a three-dimensional structure diagram of a driving shaft of the embodiment.

As shown in FIG. 1, it consists of a driving disc assembly I and a driven disc assembly II, wherein, the speed regulation mechanism is mounted in the driving disc assembly I. As shown in FIG. 1 and FIG. 2, the driven disc assembly includes a driven shaft 2, a driven disc 1, a key 3 and a conductor ring 4, the right end of the driven shaft 2 is connected to the driven disc 1 through a key 3, and the conductor ring 4 is mounted on the right end surface of the driven disc 1; as shown in FIG. 1, FIG. 2 and FIG. 4, the driving disc assembly includes a driving shaft 10, a driving disc 5, a permanent magnet assembly 6, a small gear shaft 7, a small bevel gear 11, a large bevel gear sleeve 9, a key 8, a shifting block 13 and a shifting block pin 12, the left outer circle of the driving disc 5 is fixedly mounted with permanent magnets of the same magnetization direction (N pole or S pole) and an axial through hole is arranged between every two permanent magnets, two circular holes are processed on both radial sides of the through hole, as shown in FIG. 5, at the same time the inner circle of the driving disc 5 is provided with a through hole corresponding to the position of the circular hole and sized to cooperate with the small bevel gear 11. The small gear shaft 7 passes through two circular holes on the outer circle of the driving disc 5 and the upper end is mounted with the permanent magnet assembly 6, the lower end is mounted with the small bevel gear 11, the small bevel gear 11 is located in the inner circle of the driving disc 5 and is fixed to the small gear shaft 7 and the permanent magnet assembly 6. The permanent magnet assembly 6 is composed of the permanent magnet and the yoke and is arranged with a through hole on one side and rounded corners on both sides to maintain the clearance fit with the driving disc 5 during rotation, and the permanent magnet magnetization direction is S pole (or N pole), as shown in FIG. 5. The driving shaft 10 is mounted on the right side of the driving disc 5 through the key 8. The driving shaft 10 is sleeved with the large bevel gear sleeve 9 and the large bevel gear sleeve keeps meshing with the small bevel gear 11. The left end of the large bevel gear sleeve 9 is the large bevel gear, and the right end is one long sleeve. Two chutes are symmetrically processed on the sleeve, as shown in FIG. 6. The driving shaft 10 is symmetrically provided with two straight grooves, and the right end has a larger radius to maintain the axial fixation of the large bevel gear sleeve 9, as shown in FIG. 7. Two shifting block pins 12 are mounted on the two through holes of the shifting block 13, and the shifting block 13 is sleeved on the large bevel gear sleeve 9 and can slide left and right. The shifting block pin 12 is mounted on the straight groove of the driving shaft 10 and the chute of the large bevel gear sleeve 9, maintaining a contact cooperation with the straight groove and the chute so as to achieve axial sliding.

Working principle: When the shifting block 13 is located at the rightmost end of the large bevel gear sleeve 9 and is kept axially fixed, the driving disc assembly I is driven to rotate by the power source, and relative motion of the permanent magnets alternately installed in N and S poles on the driving disc 5 is generated. Inductive eddy currents are generated in the conductor ring 4 by the principle of electromagnetic induction. The induced magnetic field generated by the induced eddy current is coupled with the original magnetic field generated by permanent magnets on the driving disc 5 and the permanent magnet assembly 6 to generate electromagnetic torque, which drives the driven disc assembly II to rotate integrally.

Figure 8:
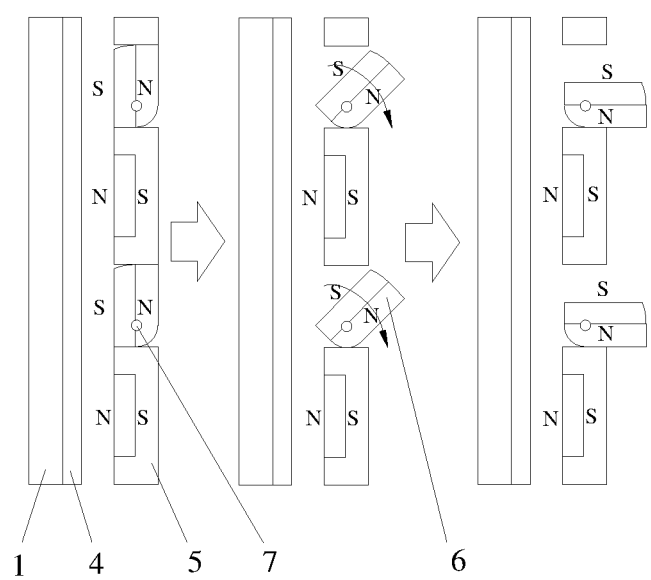
FIG. 8 is a schematic diagram showing the speed regulation principle of the disc-type speed regulation magnetic coupler based on the bevel gear transmission of the embodiment.

Speed regulation principle: The magnitude of the electromagnetic torque between the driving and driven shafts of the magnetic coupler is related to the magnitude of the air gap flux density. In the present embodiment, the shifting block 13 is moved to cause axial displacement, and the shifting block 13 is fixedly coupled to the shifting block pin 12, the shifting block pin 12 is in contact with the straight groove of the driving shaft 10 and the chute of the large bevel gear sleeve 9 simultaneously, therefore while the shifting block pin 12 slides axially in the chute of the driving shaft 10, it further drives the large bevel gear sleeve 9 to rotate at a small angle in the circumferential direction, the synchronous rotation of the permanent magnet assembly 6 is achieved by the large bevel gear on the left side of the large bevel gear sleeve 9 meshing with the small bevel gear 11 to drive the small bevel gear 11 to rotate. When the permanent magnet assembly 6 rotates, the average facing area and the average gap of the permanent magnet of the permanent magnet assembly 6 and the conductor ring are changed, and at the same time the manner in which the N and S poles are alternately arranged changes. Therefore, the flux density generated by the permanent magnet disc is gradually reduced, and the electromagnetic torque generated by the coupler is also lowered, thereby generating a speed regulation effect, as shown in FIG. 8.

In particular, when the shifting block 13 slides to the rightmost end of the large bevel gear sleeve 9, that is the permanent magnet assembly 6 does not rotate, the permanent magnets fixedly mounted on the driving disc 5 have the same magnetization direction, and the permanent magnets on the permanent magnet assembly 6 are also in the same magnetization direction, and their magnetization directions are opposite, that is the permanent magnets are alternately arranged in N and S directions; on the other hand, by rationally designing the teeth number of the bevel gear on the large bevel gear sleeve 9, the circumferential angle of the chute and the teeth number of the small bevel gear 11, it can be ensured that the teeth number of bevel gears corresponding to the circumferential angle of the chute is less than ¼ and greater than ⅛ of the total teeth number of the small bevel gear 11, that is, when the shifting block 13 slides entire length of travel along the straight groove on the drive shaft 10, the angle of rotation of the small bevel gear 11 together with the permanent magnet assembly 6 is not higher than 90° (otherwise, the permanent magnet assembly 6 interferes with the driving disc 5), and greater than ⅛ can ensure the speed regulation effect of the coupler.

The invention claimed is:

1. A disc-type speed regulation magnetic coupler based on bevel gear transmission is composed of a driving disc assembly and a driven disc assembly, wherein the speed regulation device is mounted on the driving disc assembly, the driven disc assembly includes a driven shaft, a driven disc and a conductor ring, the right end of the driven shaft is connected to the driven disc through a key, and the conductor ring is mounted on the right side of the driven disc, characterized in that, the driving disc assembly comprises a driving shaft, a driving disc, a small gear shaft, a permanent magnet assembly, a small bevel gear, a large bevel gear sleeve, a shifting block and a shifting block pin, a permanent magnet, the magnetization direction of which is opposite to that of the magnet on the permanent magnet assembly, is fixedly mounted on the left side of the driving disc and one axial through hole used for arrangement of the permanent magnet assembly is formed between every two permanent magnets, so that the permanent magnets on the driving disc assembly are alternately arranged in N and S poles, wherein the permanent magnet assembly is a structure in which the permanent magnet is fixedly mounted with yoke of the same area, the small gear shaft is mounted on the driving disc through two radial circular through holes on the side of the driving disc, and the permanent magnet assembly is fixedly connected to the upper end of the small gear shaft and the permanent magnet assembly can rotate centering on the small gear shaft in the axial through hole of the driving disc, the small bevel gear is fixedly connected to the lower end of the small gear shaft, in addition, the large bevel gear sleeve meshes with the small bevel gear, and at the same time the right end of the driving disc is connected with the driving shaft through a key, and the outer side of the driving shaft is sleeved with the large bevel gear sleeve, the shifting block pin fixedly connected with the shifting block is inserted into the chute of the large bevel gear sleeve and the straight groove of the driving shaft, and the shifting block pin is kept in contact with the chute wall of the large bevel gear sleeve and the straight groove wall of the driving shaft.

2. The disc type speed regulation magnetic coupler based on bevel gear transmission according to claim 1, characterized in that, permanent magnets, the number of which is the same as the number of pole pairs of permanent magnet, is fixedly mounted on the outer circle of the left side of the driving disc, and there is an axial through hole between every two permanent magnets, the size of the axial through hole is the same as that of the permanent magnet assembly, both radial sides of the axial through hole are provided with two circular holes, the inner circle of the driving disc is provided with a through hole corresponding to the position of the circular hole and sized to cooperate with the small bevel gear, and the central position of the through hole corresponds to the position of the radial through hole in the outer circle.

3. The disc type speed regulation magnetic coupler based on bevel gear transmission according to claim 1, characterized in that, the permanent magnet assembly is composed of permanent magnet and yoke, and is provided with a radial through hole on one side, and rounded corners on both sides to maintain a clearance fit with the axial through holes in the driving disc 5 during rotation.

4. The disc type speed regulation magnetic coupler based on bevel gear transmission according to claim 1, characterized in that, the left end of the large bevel gear sleeve is one large bevel gear and the large bevel gear meshes with the small bevel gear, the right end of the bevel gear sleeve is one hollow cylinder and the sleeve is in clearance fit with the driving shaft, the right end cylinder of the large bevel gear sleeve is also provided with chutes, the number of which is the same as that of the straight grooves on the driving shaft.

5. The disc type speed regulation magnetic coupler based on bevel gear transmission according to claim 1, characterized in that, the teeth number of the large bevel gear on the large bevel gear sleeve corresponding to circumferential angle of the chute on the large bevel gear sleeve is less than ¼ and greater than ⅛ of the total teeth number of the small bevel gear, so that the angle of rotation of the small bevel gear together with the permanent magnet assembly is not higher than 90° when the shifting block slides the whole length of travel along the straight groove on the driving shaft, otherwise the permanent magnet assembly interferes with the driving disc; and greater than ⅛ can ensure the speed regulation effect of the coupler.

\* \* \* \* \*